March 24, 1970  N. N. CAHAN  3,502,215
WATER RECLAMATION APPARATUS

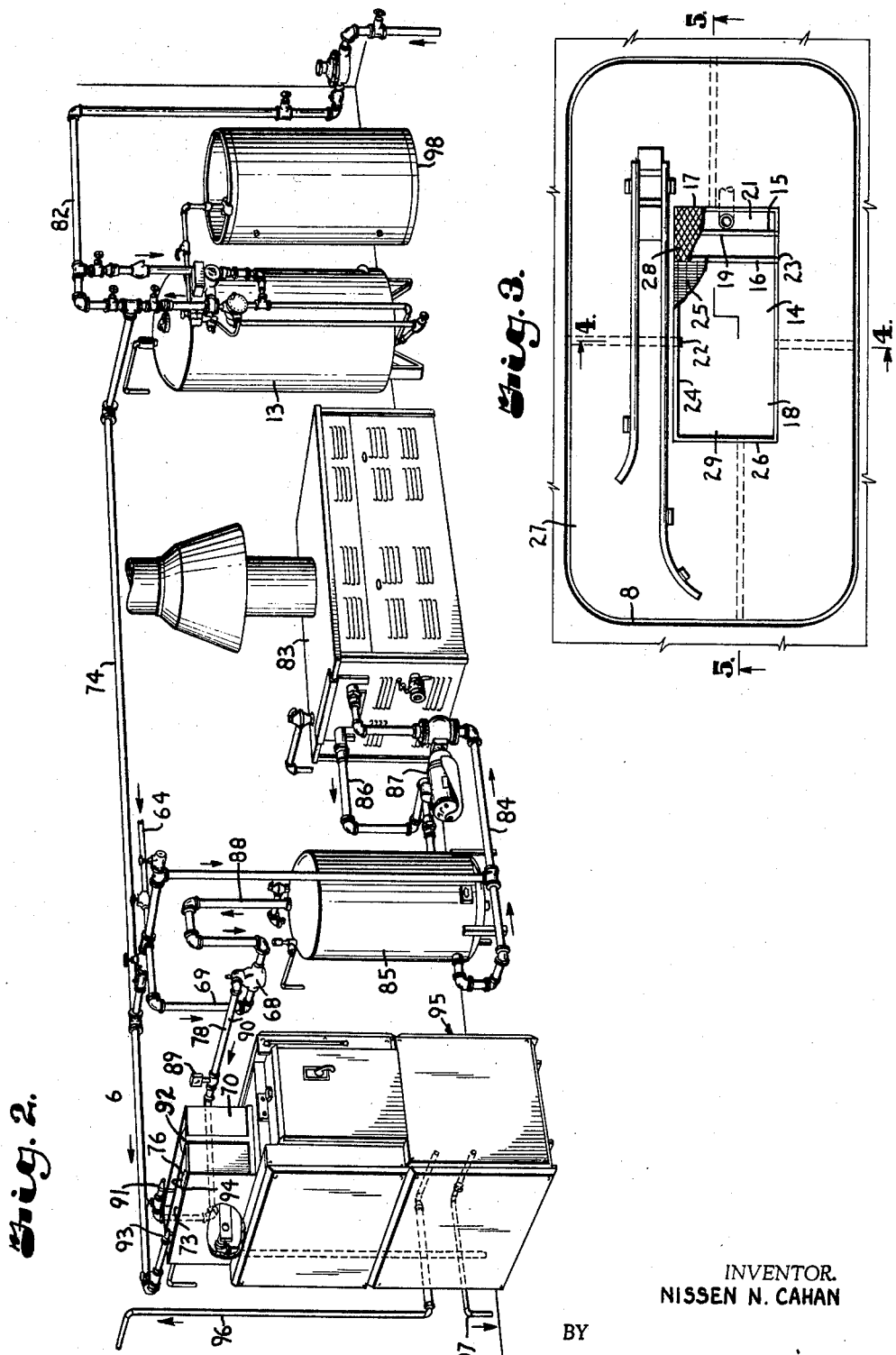

Filed Nov. 27, 1967  3 Sheets-Sheet 3

INVENTOR.
NISSEN N. CAHAN
BY
*Fishburn, Gold & Litman*
ATTORNEYS

United States Patent Office 3,502,215
Patented Mar. 24, 1970

3,502,215
WATER RECLAMATION APPARATUS
Nissen N. Cahan, Kansas City, Mo., assignor to Robo-Wash, Inc., Kansas City, Mo., a corporation of Missouri
Filed Nov. 27, 1967, Ser. No. 685,761
Int. Cl. B60s 3/02; B08b 3/10
U.S. Cl. 210—167                                    2 Claims

ABSTRACT OF THE DISCLOSURE

Water reclamation method and apparatus for reclaiming water from a water using apparatus and returning reclaimed water to the water using apparatus wherein used water is collected, flowed to a settling reservoir from which water is moved to a centrifugal separation to remove suspended solids whereby water substantially free of solids is provided, the water then being chemically treated as by an ion exchange for reducing the water hardness, the water is then stored and moved as needed to the water using apparatus for reuse therein.

---

Population and industrial expansions have resulted in increased demands for water thereby requiring capital improvements to water systems accompanied by substantial water rate increases. Sewer systems also have become overloaded by increased water usage and added treatment facilities have been required to reduce stream pollution by the sewage resulting in substantial tax increases and increased sewer use charges and water rate increases. As water rates and sewer use charges increase and sewer systems become overloaded, it becomes increasingly desirable and economically feasible and profitable to reclaim and treat used water particularly for large industrial users and for commercial users such as car or vehicle washing installations.

The principal objects of the present invention are: to provide an apparatus to reclaim water for reuse in washing operations; to provide such an apparatus where the water is wash water from automatic car or vehicle washing operations; to provide apparatus to collect such water, remove suspended solids therefrom and then treat the water being reclaimed by ion exchange; to provide such apparatus which will substantially reduce total water consumption thereby reducing cost of water used; to provide such water reclamation which will substantially reduce volume of used water delivered to a sanitary sewer system or other disposal means; to provide an apparatus for reclaiming used wash water wherein the reclaimed water is particularly adapted for but not limited to reuse in a washing cycle for car or vehicle washing operations; to provide such treating of used wash water to produce water for the washing cycle in car or vehicle wash apparatus with a saving in heat and detergent; to provide reclaimed water requiring a substantially reduced amount of added washing compounds when used in the vehicle wash apparatus; and to provide an apparatus which is simple to use, predictable and reliable in operation, economical to operate and easy to control.

Other objects and advantages of this invention will become apparent from the following description taken in connection with the accompanying drawings wherein are set forth by way of illustration and example certain embodiments of this invention.

FIG. 2 is a persepective view of a portion of the apparatus shown in FIG. 1.

FIG. 3 is a partial plan view of a car washing bay.

Figure 1:
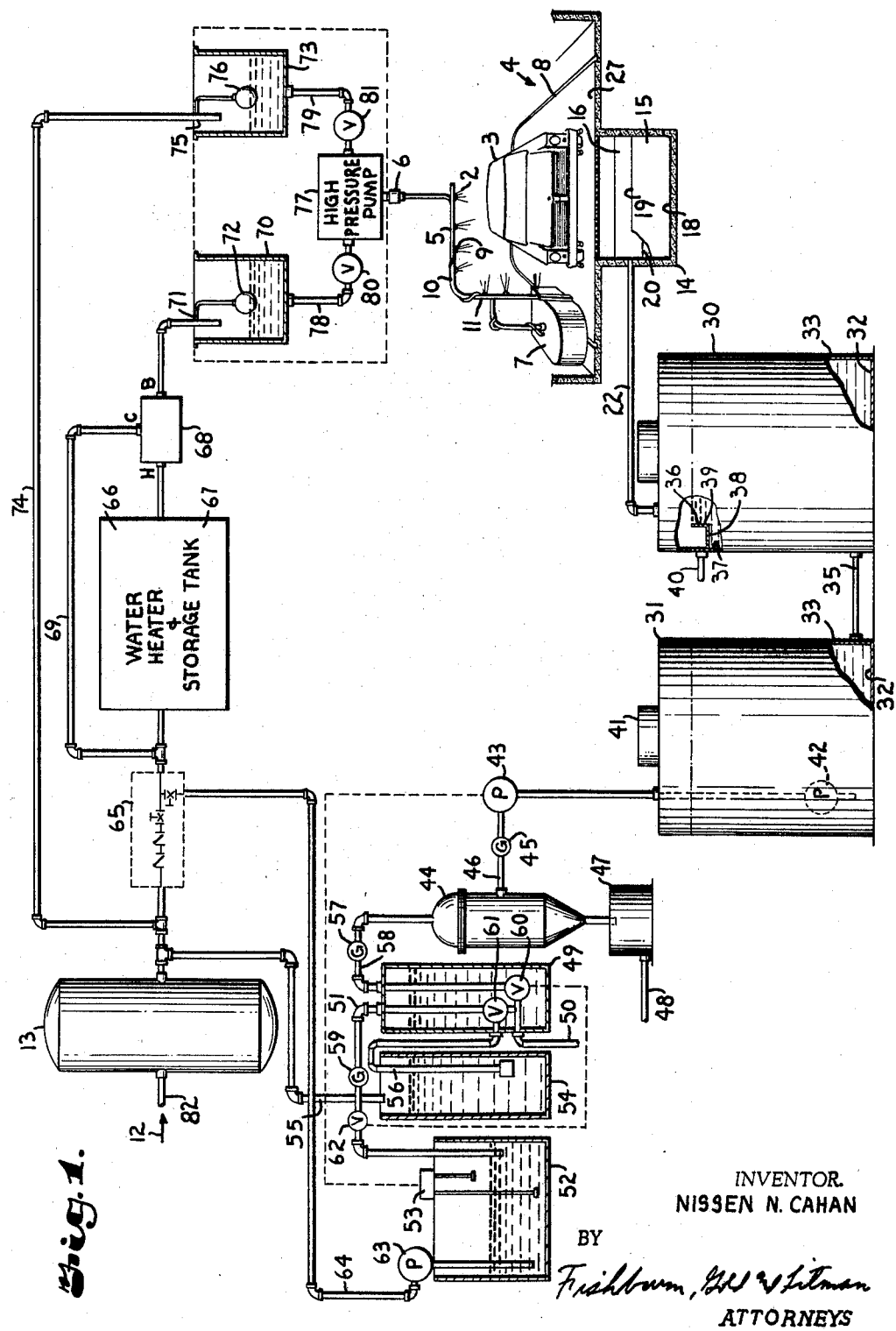
FIG. 1 is a schematic flow diagram of water treating apparatus embodying features of this invention and showing relative location and arrangement of the apparatus.
Figure 4:
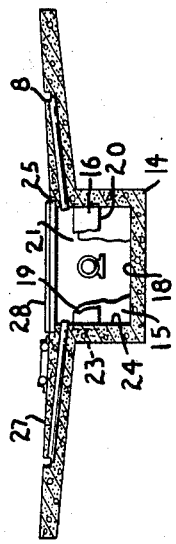
FIG. 4 is a transverse sectional view of the car washing bay taken on line 4—4, FIG. 3 and showing a used wash water collecting pit therebelow.
Figure 5:
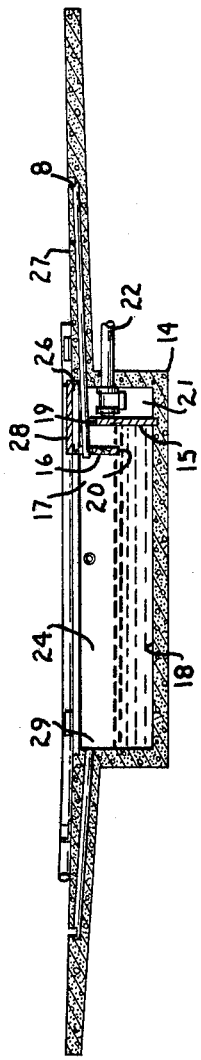
FIG. 5 is a longitudinal sectional view of the car washing bay taken on line 5—5, FIG. 3.

Referring more in detail to the drawings:

The reference numeral 1 generally designates a water using apparatus which in the illustrated example is a car or vehicle wash apparatus wherein jets 2 of washing and rinsing fluids are directed against surfaces of a vehicle 3 being washed and rinsed in a car washing bay 4. In the illustrated structure a spray arm 5 is connected to a suitable swivel apparatus 6 and supported on a mobile carriage 7. The spray arm 5 is particularly useful as part of self-service installations where a mobile carriage 7 is guided by a track 8 around the vehicle 3. Suitable spray devices 9 are mounted on the spray arm 5 which is connected to sources of treated water supply for a programmed cycle in supplying a cleansing or washing fluid for a predetermined cycle and then applying a water rinse to the surfaces of the vehicle 3 for a predetermined cycle. The spray arm 5 is shown as an inverted L-shape or the like having a horizontal or upper portion 10 extending over a portion of the top of the vehicle 3 to direct the jets 2 downwardly thereon, and a generally upright portion 11 to direct the jets 2 onto the side surfaces of the vehicle 3.

In such water use operations water from a suitable source 12 is softened in a suitable treating apparatus 13 and for the wash cycle such water is heated and suitable detergents are mixed therewith forming the washing solution directed in sprays onto the surfaces to be washed. It is preferred that soft water is supplied in the rinsing cycles. As the washing and mixing proceeds the wash water and thereafter the rinse water is directed onto the car surfaces and said water and dirt from the various surfaces of the vehicle 3 flow into a used water collecting device such as a pit 14. In the structure illustrated the pit 14 is of such structure that a portion of the solids, such as dirt and the like, are settled out of the used water collected therein. Baffles 15 and 16 are arranged transversely of the pit 14 adjacent one end 17 thereof. The baffle 15 extends upwardly from a bottom wall 18 to a level thereabove so water will flow over an uper edge 19 of the baffle 15. The baffle 16 is spaced from the baffle 15 and is in the upper portion of the pit 14 so it extends from above any water level therein to a lower edge 20 positioned below the upper edge 19 of the baffle 15. The water entering the pit 14 has a quiescent flow from a large initial settling area toward the one end 17 and must pass under the lower edge 20 of the baffle 16 and then upward and over the upper edge 19 of the baffle 15 to an outlet sump 21 for flow through a pipe or flowway 22. It is preferred that the baffles 15 and 16 be removably mounted in grooves 23 in the side walls 24 of the pit 14 for facilitating cleaning and removal of collected solids from the pit 14.

The pit 14 is preferably covered by a grating 25 which permits used water and normal dirt and other solid particles to enter the pit 14. The grating 25 is suitably supported as by a frame arranged around a top edge of the side walls 24 forming the pit 14. The car washing bay floor 27 and the pit 14 are preferably constructed of portland cement concrete with the frame 26 made of angle members embedded therein to a seat around the upper edge of the pit 14. In the illustrated structure a plate 28 forms a cover over the outlet sump 21 that extends from the baffle 16 to the one end 17 of the pit 14 so the water will enter the pit 14 in the large initial settling area between the baffle 16 and the other end 29.

The pit effluent pipe 22 extends through one of the pit side walls 24 and has an inlet communicating with the outlet sump 21 at a level below the upper edge 19 of the baffle 15.

In the illustrated example the used wash water collected in the pit 14 flows by gravity through the pipe 22 to a used water storage and settling structure which may be one or more tanks or reservoirs. To provide a long period of residence or retention the tanks are of large capacity as for example in the nature of a combined capacity of 3,000 gallons. In the structure illustrated the settling structure is in the form of two tanks 30 and 31 each having bottom walls 32 and upstanding side walls 33 with top walls or covers 34. The tanks 30 and 31 are in communication with each other and in the illustrated structure, are connected by a cross-over pipe 35 for flow therebetween. The pit effluent pipe 22 discharges into the tank 30 adjacent the top 34 thereof. It has been found that suspended solids in water falling into another body of water will continue to fall while the water remains near an upper surface of the body of water.

Water from the tank 30 flows through the cross-over pipe 35 to the tank 31 in spaced relation above the respective tank bottom walls 32 so an ample volume of solids may settle and collect on the respective bottom walls 32 without interference with the flow. Such spacing preferably is in the nature of 9 or more inches.

A flume 36 is mounted on an inside surface 37 of the side walls 33 of the tank 30 and positioned adjacent the upper end thereof to serve as an inlet to and overflow for excess water. The flume 36 has a bottom wall 38 and a side wall 39 extending upwardly from the bottom wall 38 and substantially parallel with the side wall 33. The flume side wall 39 acts as a weir for overflow of excess water. The flume 36 communicates with an overflow pipe 40 which conveys the excess water to a suitable sewer or other disposal systems.

It is preferable to mount the flume 36 on the tank 30 because when excess water overflows into the flume 36 the water will contain some suspended solids which will flow to the sewer system or other disposal system. The water in tank 31 will be quiescent as compared to turbulence occurring in tank 30 during overflow of excess water into the flume 36 and the discharge of pit effluent into tank 30 through pipe 22. Considerably more of the suspended solids will settle in tank 30 than in tank 31 when the flume 36 is mounted in tank 30.

In the illustrated structure, each of the used water storage tanks or reservoirs 30 and 31 respectively have an access opening or manhole 41 in their respective top walls 34 for removing the solids settled out of the used water in the respective reservoirs.

A suitable pump 42, such as a sump pump, is positioned in the used water tank or reservoir 31 for moving the water therein to additional treating apparatus. The inlet of the pump 42 preferably is positioned 18 inches or more above the bottom wall 32 thereby preventing agitating of solids which have settled in the tank or reservoir 31.

While the water from the tank or reservoir 31 could be moved to a chemical treatment stage, there is the possibility that suspended solids would still be present in the water, therefore it is preferred that the water be subjected to a centrifugation separation prior to the chemical treatment. In the apparatus illustrated, a suitable high pressure remote controlled pump 43 aids the sump pump 42 in moving the water from the used wash water reservoir 31 to a centrifugal separator 44 where an additional portion of suspended solids in the used wash water are separated from the water by centrifugal action thereby providing water substantially free of solids. A pressure gauge 45 is positioned in a pipe 46 connecting the high pressure pump 43 and the centrifugal separator 44 for measuring the water pressure in the pipe 46.

Suspended solids removed by the centrifugal separator 44 and a sufficient quantity of water to move same flow by gravity out of the centrifugal separator 44 to a suitable sump 47 which has a sump outlet line or pipe 48 connected to a sewer or other suitable disposal system (not shown).

The water is moved from the centrifugal separator 44 to a chemical treatment to reduce the hardness. In the illustrated system the water moves to an ion exchange unit 49 wherein the water hardness is reduced by exchanging ions in said unit with ions in the used water received from the centrifugal separator 44 thereby reclaiming the water collected in the pit 14 for reuse in the water using apparatus 1. The ion exchange unit 49 has a drain line 50 connected to the sewer or other suitable disposal system. An outlet line 51 from the ion exchange unit 49 delivers softened and reclaimed water to a holding basin 52, or other suitable reservoir for storage of solid face softened reclaimed water.

A level control probe 53 is positioned in the basin 52 and is operative to indicate high and low water levels in the holding basin 52. The probe 53 is operatively connected to the remote controlled pump 43 and to the sump pump 42 to turn off the pumps 42 and 43 when the holding basin 52 is full and turn on the pumps 42 and 43 when the water in the holding basin 52 reaches the low water level as sensed by the probe 53.

The ion exchange unit 49 must be periodically recharged, therefore a regenerate storage tank 54 containing a suitable recharging solution is connected to the ion exchange unit 49 and is operative to recharge same. In the illustrated structure a suitable source of clean water enters the regenerate tank 54 through a regenerate tank inlet line 55 and the recharging solution enters the ion exchange unit 49 through regenerate tank outlet line 56.

A pressure gauge 57 is positioned in a pipe 58 connecting the centrifugal separator 44 and the ion exchange unit 49 for measuring the water pressure in the connecting pipe 58. A pressure gauge 59 is positioned in the ion exchange unit outlet line 51 for measuring water pressure in the line delivering water to the holding basin 52.

Suitable automatic valves 60 and 61 are positioned within the ion exchange unit 49 for controlling water flow into and out of the ion exchange unit. In the illustrated structure, the valves 60 and 61 are positioned in the connecting pipe 58 and the ion exchange unit outlet line 51 respectively. A diaphragm valve 62 is positioned in the ion exchange unit outlet line 51 and is operatively connected to the valve 60 for activating same for controlling flow through the ion exchange unit 49.

The water in the holding basin 52 contains suitable washing compounds or detergents in solution therefore the water is suitable for reuse in a washing cycle when returned to the water using apparatus 1 for handling substantially in the same manner as the initial washing cycle. The reuse of the washing compounds or detergents results in a substantial savings while maintaining an efficient cleaning of the vehicle surfaces. In the structure illustrated, a suitable pump 63 is positioned in a holding basin outlet line 64 for moving the reclaimed water to the handling equipment connected with the water using apparatus 1 for reuse of the reclaimed wash water.

In the schematic flow diagram illustrated in FIG. 1 the basin outlet line 64 delivers the reclaimed water to a suitable valve box 65 containing the necessary valves required by local regulations for anti-cross connection between a local water supply and the basin outlet line 64. The reclaimed water flows through a water heater 66 and storage tank 67 to a suitable blending means such as a valve 68 for blending hot water from the water heater 66 and storage tank 67 with cold water received from a cold water bypass line 69. The blending valve 68 is operative to deliver blended water at a selected temperature to a blended water storage reservoir 70.

A blended water float control valve 71 is positioned in and responsive to a level of water in the blended water reservoir 70. A float 72 for the valve 71 opens and closes same thereby controlling the flow of blended water into the reservoir 70.

A cold water reservoir 73 receives softened water from a suitable water softener 13 through a softener outlet line 74. A cold water float controlled means, such as a valve 75, is controlled by a float 76 and is responsive to a level of water in the reservoir 73.

A sutable high pressure pump 77 is operative to selectively deliver wash and rinse water to the spray arm 5. In the illustrated structure the pump 77 has a blended water inlet line 78 connected to the blended water reservoir 70 and a cold water inlet line 79 connected to the cold water reservoir 73 respectively. Suitable remote controlled valves 80 and 81, such as by solenoid valves, are positioned in the blended water inlet line 78 and the cold water inlet line 79 respectively for selectively delivering blended water and cold water to the spray arm 5.

In the structure illustrated in FIG. 2 a suitable source of water, such as city water, enters the water softener 13 through an inlet line 82. The water softener 13 is operative to deliver soft water through the softener outlet line 74 to a water heater 83 through a heater inlet line 84.

Water flows from the water heater 83 to a hot water storage tank 85 through a water heater outlet line 86. A suitable recirculating pump 87 is operative to pump water from the hot water storage tank 85 to the water heater 83 and return heated water to the storage tank 85. The recirculating pump 87 is positioned in the heater inlet line 84 so it is not subjected to the temperature of the heated water from the heater 83. The blending or tempering valve 68 blends cold water received through the cold water by-pass line 69 and hot water received from the hot water storage tank 85 through a storage tank outlet line 88. A tempered or blended water thermometer 89 is positioned in a blended water line 90 connecting the blended water reservoir 70 and the blending valve 68 for displaying the temperature of the water delivered to the blended water reservoir 70.

In the structure illustrated in FIG. 2 the blended water reservoir 70 is an open top tank having over-the-rim water supply from the blended water line 90. A blended water float controlled means, such as a valve 91, is operated by a suitable float 92 that is responsive to a level of water in the blended water reservoir 70.

The water softener outlet line 74 is connected to the cold water reservoir 73 where a cold water float valve 93 is positioned to control flow into the cold water reservoir 73. The float valve is operatively controlled by a float 94 that is responsive to a level of water in the cold water reservoir 73. In the illustrated structure the cold water reservoid 73 is also an open top tank having over-the-rim water supply and the cold water reservoir 73 and the blended water reservoir 70 are positioned side by side as part of a package unit 95. The high presssure pump 77, the remote controlled valves 80 and 81, the blended water inlet line 78 and the cold water inlet line 79 are all positioned within the package unit 95.

In the illustrated structure the basin outlet line 64 is connected to the heater inlet line 84 adjacent to a connection with the cold water bypass line 69 thereby supplying reclaimed water to the blending valve 68 either cold or heated by the water heater 83. It is preferred that reclaimed water from the basin 52 be used for the water supply to the blended water reservoir 70 however, the water softener outlet line 74 is connected to the heater inlet line 84 and to the cold water bypass line 69 to supply hot and cold water to the blending valve 68 when the supply of reclaimed water is cut off or inadequate.

High pressure pump outlet lines 96 and 97 supply water from the blended water reservoir 70 and the cold water reservoir 73 to the spray arm 5 and to suitable wheel washing equipment (not shown) respectively.

The water softener 13 must be regenerated or recharged periodically. In the illustrated structure a brine regenerate storage tank 98 is connected to the water softener 13 and is operative to suitably recharge said softener.

In operation, washing and rinsing fluids from the surfaces of the vehicle 3 are collected in the pit 14 where initial settling of a portion of the dirt and other solids occurs. The baffles 15 and 16 respectively are positioned transverse to the pit outflow pipe 22 to control the outflow of effluent from the pit 14. Additional solids are settled out of the used wash water in the used water reservoirs 30 and 31 respectively. When the probe 53 indicates that the water level in the basin 52 is low, the pumps 42 and 43 are activated to move the used water from the used water reservoir 31 to the centrifugal separator 44 for removal of additional suspended solids thereby providing substantially solid free water and then to the ion exchange unit 49 for reducing water hardness thereby reclaiming the water for reuse in the washing cycle of the spray apparatus 1.

Figure 6:
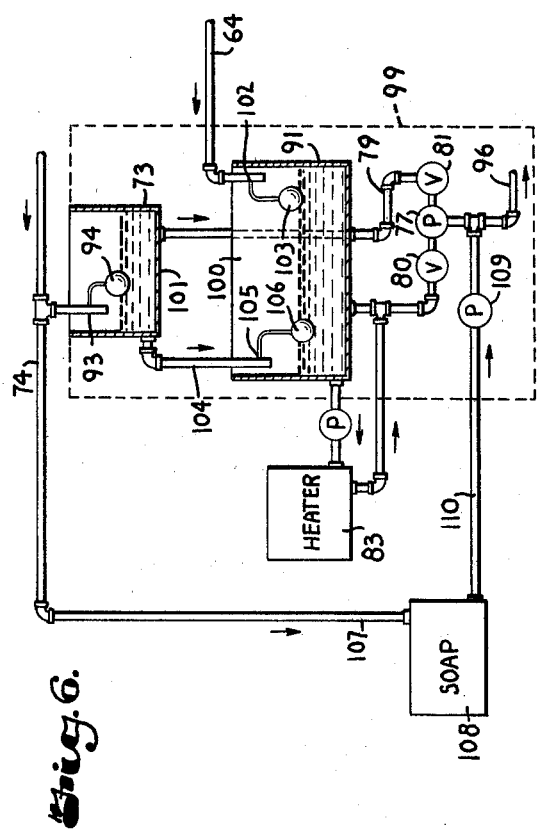
FIG. 6 is a partial schematic flow diagram of a modified form of the present invention.

FIG. 6 illustrates a modified package unit 99 in which the basin outlet line 64 delivers reclaimed water from the basin 52 to a reclaimed water reservoir 100 positioned below a cold water reservoir 101. A reclaimed water float valve 102 is operated by a suitable float 103 that is responsive to a level of water in the reclaimed water reservoir 100 thereby controlling the flow of reclaimed water from the reclaimed water holding basin 52.

In the modified package unit 99, the cold water reservoir 101 is positioned over the reclaimed water reservoir 100 and a make-up water line 104 permits flow from the cold water reservoir 101 to the reclaimed water reservoir 100. A make-up float valve 105 is operated by a suitable float 106 which is positioned in the reclaimed water reservoir 100 at a lower level than the reclaimed water float 103 thereby controlling flow of the water from the cold water reservoir 101 into the reclaimed water reservoir 100 so that flow occurs only when water from the holding basin 52 is cut off or inadequate. The cold water inlet line 79 is positioned within the package unit 99 so as to pass by or adjacent the reclaimed water reservoir 100.

FIG. 6 illustrates schematically the apparatus for introducing washing compounds or detergents to the spray arm 5. The softener outlet line 74 is connected to a soap tank inlet line 107 which supplies softened water to a soap or washing compound mixing tank 108. A suitable pump 109 moves a mixture of washing compounds or detergents and softened water through a soap tank outlet line 110 to the high pressure pump outlet line 96 and the connection of the soap tank outlet line 110 with the high pressure pump outlet line 96 is within the package unit 99.

The pump 109 is positioned in the modified package unit 99. When the remote controlled valve 80 is opened to permit water to flow from the heater 83 and from the reclaimed water reservoir 100 to the high pressure pump 77, the pump 109 is also activated to move the mixture of washing compounds or detergents and softened water to the spray arm 5.

In operation the modified package unit 99 receives water from the water softener 13 which is operative to deliver soft water through the softener outlet line 74 to the cold water reservoir 101. The reclaimed water is delivered to the reclaimed water reservoir 100 through the basin outlet line 64. Water from the cold water reservoir 101 is used for rinse water in the spray arm 5 and for make-up water in the reclaimed water reservoir 100 when clean water from the holding basin 52 is inadequate. Water from the reclaimed water reservoir is moved to the water heater 83 and pumped to the spray arm 5 or returned to and stored in the reclaimed water reservoir 100 until the remote controlled valve 80 is activated to permit the pump 77 to move hot water to the spray arm 5.

It is to be understood that while I have illustrated certain forms of my invention it is not to be limited to the specific forms or arrangement of parts herein described and shown except insofar as such limitations are included in the claims.

What I claim and desire to secure by Letters Patent is:

1. Water reclamation apparatus comprising:
   (a) a water use apparatus providing a supply of used water,
   (b) a settling container having a capacity for quiescent water movement therein for settling unsuspended solids from said used water,
   (c) means collecting said used water from said water use apparatus and moving said used water to said settling container,
   (d) a centrifugal separator for removing suspended particles from said used water, means moving said used water from the settling container to said centrifugal separator,
   (e) an ion exchange unit,
   (f) means moving said water substantially free of suspended particles from said centrifugal separator through said ion exchange unit to reduce the hardness thereof,
   (g) a hot water reservoir, connecting means between said hot water reservoir and said ion exchange unit whereby hardness reduced water is received by said hot water reservoir from said ion exchange unit,
   (h) water heating means, recirculating means connected between said water heating means and said hot water reservoir for circulation of water therebetween,
   (i) blending means connected between said ion exchange unit and said hot water reservoir and adapted to blend water respectively therefrom to obtain a selected temperature blended water, a blended water tank connected to said blending means and receiving said blended water therefrom,
   (j) a source of clean softened water,
   (k) a clean softened water tank, connecting means between said last named tank and said source of clean softened water whereby said last named tank receives water from said source of clean softened water,
   (l) a washing compound tank connected to said source of clean softened water and having a mixture of washing compounds and softened water therein,
   (m) means moving clean softened water from said clean softened water tank to said blended water tank to maintain a selected water level therein, and
   (n) means selectively moving blended water from said blended water tank and clean softened water from said clean softened water tank and a mixture of washing compounds and softened water from said washing compound tank to said water use apparatus.

2. Water reclamation apparatus comprising:
   (a) a water use apparatus providing a supply of used water,
   (b) a settling container having a capacity for quiescent water movement therein for settling unsuspended solids from said user water,
   (c) means collecting said used water from said water use apparatus and moving said used water to said settling container,
   (d) means for removing suspended particles from said used water, means moving said used water from the settling container to said particle removing means,
   (e) a water softening unit,
   (f) means moving said water substantially free of suspended particles from said particle removing means through said water softening unit to reduce the hardness thereof,
   (g) a hot water reservoir, connecting means between said hot water reservoir and said water softening unit whereby hardness reduced water is received by said hot water reservoir from said water softening unit,
   (h) water heating means associated with said hot water reservoir for heating water therein,
   (i) blending means connected between said water softening unit and said hot water reservoir and adapted to blend water respectively therefrom to obtain a selected temperature blended water, a blended water tank connected to said blending means and receiving said blended water therefrom,
   (j) a source of clean softened water,
   (k) a clean softened water tank, connecting means between said last named tank and said source of clean softened water whereby said last named tank receives water from said source of clean softened water,
   (l) a washing compound tank connected to said source of clean softened water and having a mixture of washing compounds and softened water therein, and
   (m) means selectively moving blended water from said blended water tank and clean softened water from said clean softened water tank and a mixture of washing compounds and softened water from said washing compound tank to said water use apparatus.

References Cited

UNITED STATES PATENTS

| | | | |
|---|---|---|---|
| 1,886,267 | 11/1932 | Gleason et al. | 210—27 |
| 2,748,077 | 5/1956 | Hodan et al. | 210—27 |
| 3,339,565 | 9/1967 | Williams | 134—123 X |
| 3,337,896 | 8/1967 | Allen | 134—123 X |
| 3,378,018 | 4/1968 | Lawter | 134—123 X |
| 3,421,526 | 1/1969 | Alkire et al. | 134—123 X |

SAMIH N. ZAHARNA, Primary Examiner

U.S. Cl. X.R.

134—109, 123; 210—182, 259